US010625552B2

(12) United States Patent
Willemenot et al.

(10) Patent No.: US 10,625,552 B2
(45) Date of Patent: Apr. 21, 2020

(54) MOTOR VEHICLE COMPRISING RUNNING GEAR ATTACHMENT GUIDE MEANS

(71) Applicant: RENAULT s.a.s., Boulogne Billancourt (FR)

(72) Inventors: Johann Willemenot, Le Plessis Robinson (FR); Olivier Rioult, Voisins le Bretonneux (FR)

(73) Assignee: RENAULT s.a.s., Boulogne Billancourt (FR)

( * ) Notice: Subject to any disclaimer, the term of this patent is extended or adjusted under 35 U.S.C. 154(b) by 89 days.

(21) Appl. No.: 15/127,714

(22) PCT Filed: Mar. 17, 2015

(86) PCT No.: PCT/FR2015/050650
§ 371 (c)(1),
(2) Date: Sep. 20, 2016

(87) PCT Pub. No.: WO2015/145023
PCT Pub. Date: Oct. 1, 2015

(65) Prior Publication Data
US 2018/0170137 A1 Jun. 21, 2018

(30) Foreign Application Priority Data
Mar. 27, 2014 (FR) ..................... 14 52634

(51) Int. Cl.
*B60G 7/02* (2006.01)
*B60G 9/02* (2006.01)

(52) U.S. Cl.
CPC ............... *B60G 7/02* (2013.01); *B60G 9/027* (2013.01); *B60G 2200/23* (2013.01);
(Continued)

(58) Field of Classification Search
CPC ...... B60G 7/02; B60G 9/027; B60G 2200/23; B60G 2204/4302; B60G 2204/143;
(Continued)

(56) References Cited

U.S. PATENT DOCUMENTS 2,753,190 A * 7/1956 Hooven ................. B60G 9/027
267/273
3,001,600 A * 9/1961 MacPherson .......... B60G 9/027
180/353
(Continued)

FOREIGN PATENT DOCUMENTS

| DE | 196 34 215 A1 | 2/1998 |
| DE | 10 2008 029 136 A1 | 12/2009 |
| EP | 0 560 242 A1 | 9/1993 |

OTHER PUBLICATIONS

International Search Report dated Jun. 8, 2015, in PCT/FR2015/050650 filed Mar. 17, 2015.
(Continued)

*Primary Examiner* — Paul N Dickson
*Assistant Examiner* — Timothy Wilhelm
(74) *Attorney, Agent, or Firm* — Oblon, McClelland, Maier & Neustadt, L.L.P.

(57) ABSTRACT

A motor vehicle includes a bodywork structural element and a running gear, such as a vehicle back end, that includes at least one arm. The at least one arm includes a top attachment end that is received in a sheet metal clevis supported on a bottom surface of a floor of the bodywork structural element. The attachment end includes at least one transverse tubular sleeve that is received with reduced play between two parallel flanks of the clevis, and an attachment screw capable of passing through two coaxial bores of both flanks and the transverse tubular sleeve to enable attachment of the attachment end into the clevis. The clevis guides the attachment
(Continued)

Figure 1:
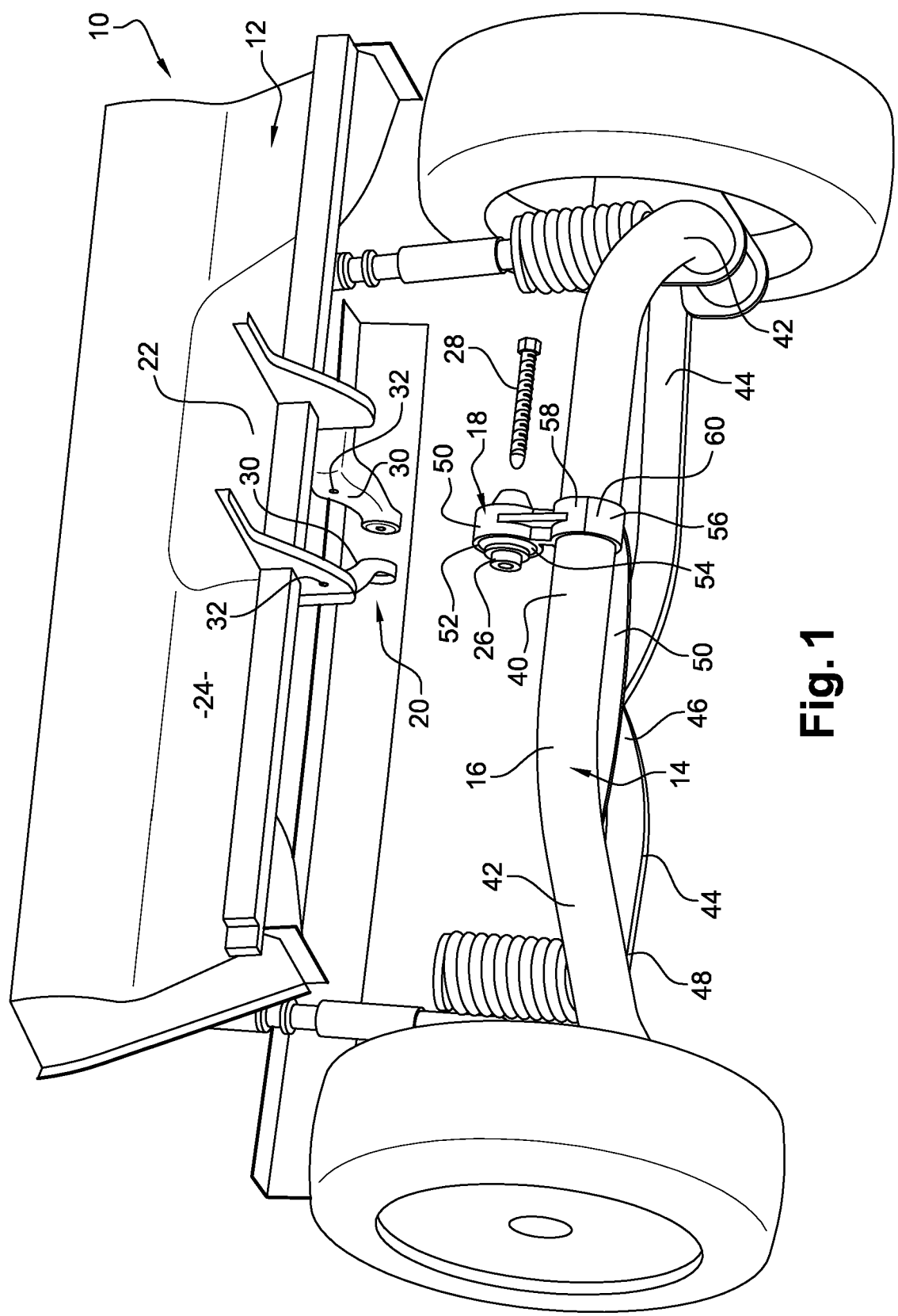

end into a position for aligning the bores of the flanks and the sleeve.

11 Claims, 5 Drawing Sheets

(52) U.S. Cl.
CPC .... *B60G 2200/324* (2013.01); *B60G 2204/14* (2013.01); *B60G 2204/143* (2013.01); *B60G 2204/4302* (2013.01); *B60G 2204/44* (2013.01); *B60G 2204/4404* (2013.01)

(58) Field of Classification Search
CPC ...... B60G 2200/324; B60G 2204/4404; B60G 21/052; B60G 21/0051
See application file for complete search history.

(56) References Cited

U.S. PATENT DOCUMENTS

| | | | | | |
|---|---|---|---|---|---|
| 3,025,915 | A * | 3/1962 | Kelly | | A01B 13/02 172/239 |
| 3,134,609 | A * | 5/1964 | McCarty | | A01D 34/03 172/272 |
| 3,498,410 | A * | 3/1970 | Storch | | B63B 27/14 182/159 |
| 3,785,672 | A * | 1/1974 | Shakespear | | B60G 9/027 280/124.116 |
| 3,840,210 | A * | 10/1974 | Hollingsworth | | B66F 7/0625 254/84 |
| 4,053,171 | A * | 10/1977 | Hyler | | B60G 9/027 280/124.116 |
| 4,343,484 | A * | 8/1982 | Van Antwerp | | B60D 1/465 172/272 |
| 4,366,883 | A * | 1/1983 | Reeves | | B66F 9/08 187/224 |
| 4,456,420 | A * | 6/1984 | Newhard | | B60P 3/125 293/118 |
| 4,736,964 | A * | 4/1988 | Specktor | | B60G 7/02 280/86.75 |
| 4,823,896 | A * | 4/1989 | Evans | | B60B 11/00 180/24.01 |
| 4,946,189 | A * | 8/1990 | Manning | | B60G 9/027 180/349 |
| 4,948,160 | A * | 8/1990 | Barry | | B60G 13/006 280/86.753 |
| 5,052,711 | A * | 10/1991 | Pirkey | | B62D 17/00 280/86.753 |
| 5,192,101 | A * | 3/1993 | Richardson | | B60G 11/26 180/209 |
| 5,879,026 | A * | 3/1999 | Dostert | | B60G 3/24 180/311 |
| 5,967,668 | A * | 10/1999 | Germano | | B60G 7/02 267/293 |
| 6,086,076 | A * | 7/2000 | Prem | | B60G 3/14 180/24.07 |
| 6,089,675 | A * | 7/2000 | Schlanger | | B60B 27/023 280/279 |
| 6,352,125 | B1 * | 3/2002 | Shoup | | A01B 59/00 172/439 |
| 6,416,067 | B1 * | 7/2002 | Kugler | | B60G 7/003 280/104 |
| 6,443,490 | B2 * | 9/2002 | Webb | | B66C 23/80 212/305 |
| 6,478,317 | B2 * | 11/2002 | Konop | | F16F 1/3863 180/209 |
| 6,494,518 | B2 * | 12/2002 | Kreil | | B60P 3/34 296/26.01 |
| 6,857,254 | B2 * | 2/2005 | Melone | | A01D 34/64 56/15.8 |
| 7,270,341 | B2 * | 9/2007 | Longworth | | B60G 7/001 280/124.11 |
| 7,273,217 | B2 * | 9/2007 | Rudder | | B60G 11/04 280/86.751 |
| 7,331,548 | B1 * | 2/2008 | Simkulet | | B64C 5/02 244/220 |
| 7,331,588 | B2 * | 2/2008 | Johnson | | B60G 9/00 280/124.116 |
| 7,658,412 | B2 * | 2/2010 | Ramsey | | B60G 7/02 280/784 |
| 7,780,241 | B2 * | 8/2010 | Sprock | | B60G 9/02 280/86.75 |
| 7,891,679 | B2 * | 2/2011 | Svartz | | B60G 7/006 280/124.175 |
| 8,025,312 | B1 * | 9/2011 | Honas | | A01D 75/002 280/769 |
| 8,322,643 | B2 * | 12/2012 | Gervais | | B02C 1/10 241/101.742 |
| 8,851,499 | B1 * | 10/2014 | Thompson | | B62D 61/12 280/298 |
| 8,935,965 | B1 * | 1/2015 | Selbig | | G01N 1/16 73/863.41 |
| 8,967,639 | B2 * | 3/2015 | Conaway | | B60G 5/04 280/124.128 |
| 9,010,792 | B2 * | 4/2015 | Talavasek | | B62M 6/40 180/220 |
| 9,233,589 | B1 * | 1/2016 | Miller | | B60G 7/02 |
| 9,308,961 | B2 * | 4/2016 | McDonald | | B62K 25/02 |
| 9,315,211 | B2 * | 4/2016 | Qattan | | B62D 13/06 |
| 9,315,222 | B1 * | 4/2016 | Wetter | | B60G 9/02 |
| 9,710,989 | B2 * | 7/2017 | Matsuoka | | B65H 5/066 |
| 9,809,252 | B2 * | 11/2017 | Caillard | | B62D 21/11 |
| 9,914,334 | B2 * | 3/2018 | Hlubina | | B60G 9/027 |
| 2004/0108672 | A1 * | 6/2004 | Enck | | B60G 7/02 280/86.755 |
| 2005/0156398 | A1 * | 7/2005 | Ramsey | | B60G 7/02 280/124.116 |
| 2011/0031713 | A1 * | 2/2011 | Ekbundit | | B60G 7/02 280/124.121 |
| 2011/0084546 | A1 | 4/2011 | Luede | | |
| 2013/0113197 | A1 * | 5/2013 | Oriet | | B60G 3/20 280/786 |
| 2014/0231157 | A1 * | 8/2014 | Green | | B62D 55/02 180/9.54 |
| 2017/0088190 | A1 * | 3/2017 | Hlubina | | B62D 25/2027 |

OTHER PUBLICATIONS

French Search Report dated Nov. 14, 2014, in French Application 1452634 filed Mar. 27, 2014.

* cited by examiner

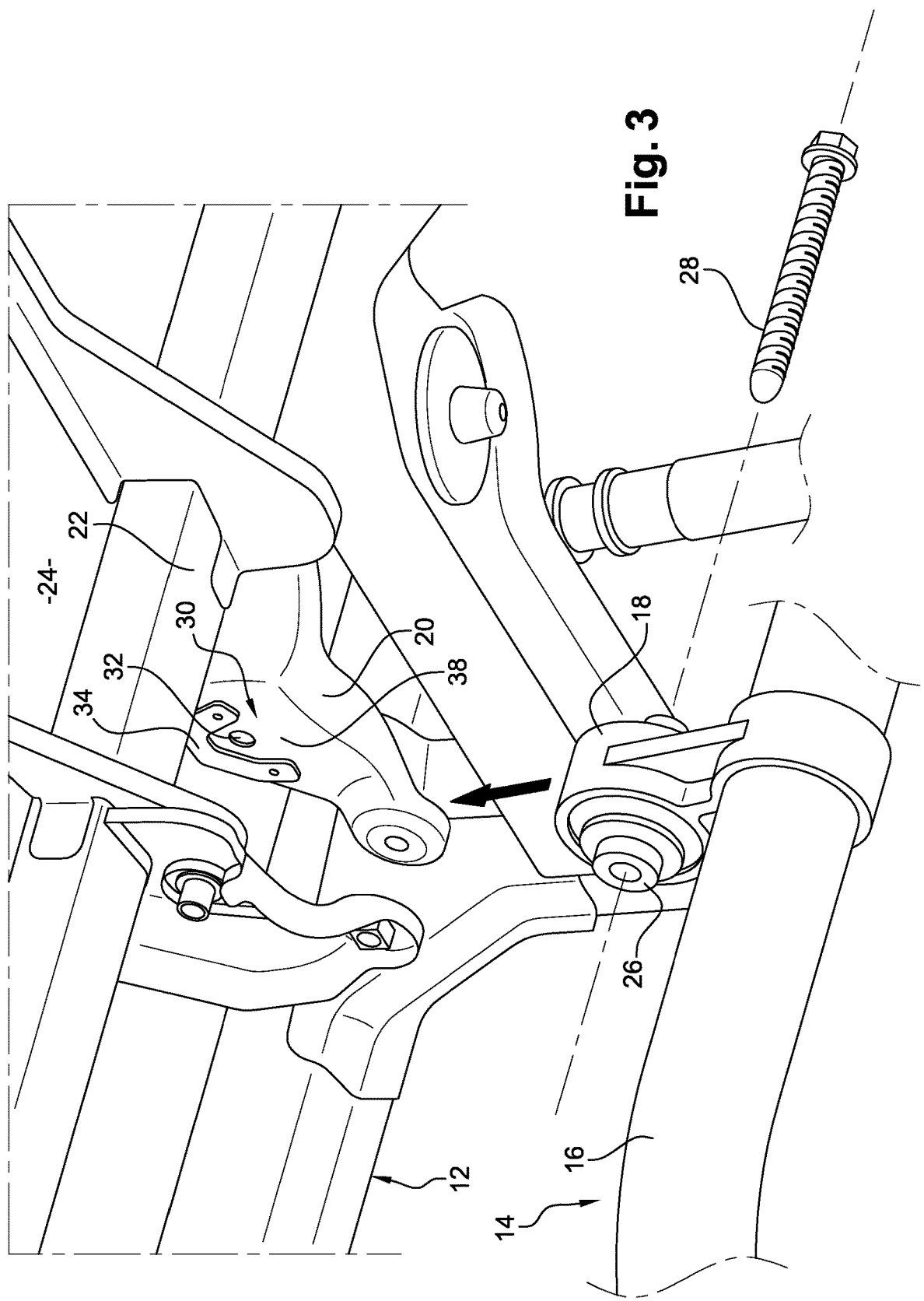

MOTOR VEHICLE COMPRISING RUNNING GEAR ATTACHMENT GUIDE MEANS

The invention relates to a motor vehicle.

The invention relates more specifically to a motor vehicle comprising a structural bodywork element and a running gear, particularly a rear axle, that comprises at least one arm comprising an upper attachment extremity that is received in a sheet metal clevis supported on a lower face of a floor of the structural bodywork element, said attachment extremity comprising at least one transverse tubular sleeve that fits with limited clearance between two parallel flanks of said clevis, and an attachment screw designed to pass through two coaxial bores in both flanks and said transverse tubular sleeve so as to enable attachment of said attachment extremity into the clevis.

Numerous examples of motor vehicles having a rear axle attached to the floor of the structural bodywork element in this manner are known.

Such a design raises numerous assembly issues, since the bores in the flanks and the sleeve need to be aligned, and the rear axle and structural bodywork element are voluminous, heavy elements that are difficult to move around precisely, even using a handling system.

It is therefore very difficult, within an assembly shop, to ensure good coaxiality of the bores in the flanks with the sleeve before insertion of the attachment screw.

The invention overcomes this drawback by proposing a motor vehicle comprising means for guiding the attachment extremity of the arm of the rear axle designed to enable the sleeve to be positioned coaxially with the bores in the flanks.

For this purpose, the invention proposes a motor vehicle of the type described above, characterized in that the clevis comprises means for guiding the attachment extremity into a position in which the bores in the flanks and in the sleeve are aligned.

According to other features of the invention
- each flank has means for guiding a corresponding axial end of the tubular sleeve towards the position in which the bores in the flanks and in the sleeve are aligned.
- each guide means projects perpendicular from one face of said flank oriented towards the sleeve and is arranged in a transverse plane and has an arch shape in which the concavity is designed to determine an immobilized position for the end of the tubular sleeve butting against the rib, the tubular sleeve being coaxial to the bore in the flank,
- each guide means includes a series of lugs arranged around the arch shape,
- each guide means includes a rib arranged around the arch shape,
- the arch shape of the rib is semi-circular and the internal diameter of same corresponds to the external diameter of the sleeve,
- the arch shape of the rib is trapezoidal and matches the external diameter of the sleeve,
- the concavity of the rib is oriented away from the floor to enable the end of the tubular sleeve to be moved to the immobilized position by raising said sleeve,
- the concavity of the rib is oriented towards the floor to enable the end of the tubular sleeve to be moved to the immobilized position by lowering said sleeve and to be held in said immobilized position by gravity,
- the rear axle is semi-rigid and comprises:
  - a central tubular arm comprising a transverse section, a central portion of which has the attachment extremity, and two trailing arms extending on either side of the transverse section,
  - two cross arms, which have first ends articulated with a cradle attached beneath the lower face of the floor of the structural bodywork element, and second ends articulated with the ends of the trailing arms,
  - the rear axle having an attachment element that includes an upper ring that includes a bore designed to receive a cylindrical elastomer element in turn designed to coaxially receive the tubular sleeve and the lower ring, which holds the central arm, and that includes a foot and a semi-cylindrical cover that are attached to one another.

Figure 2:
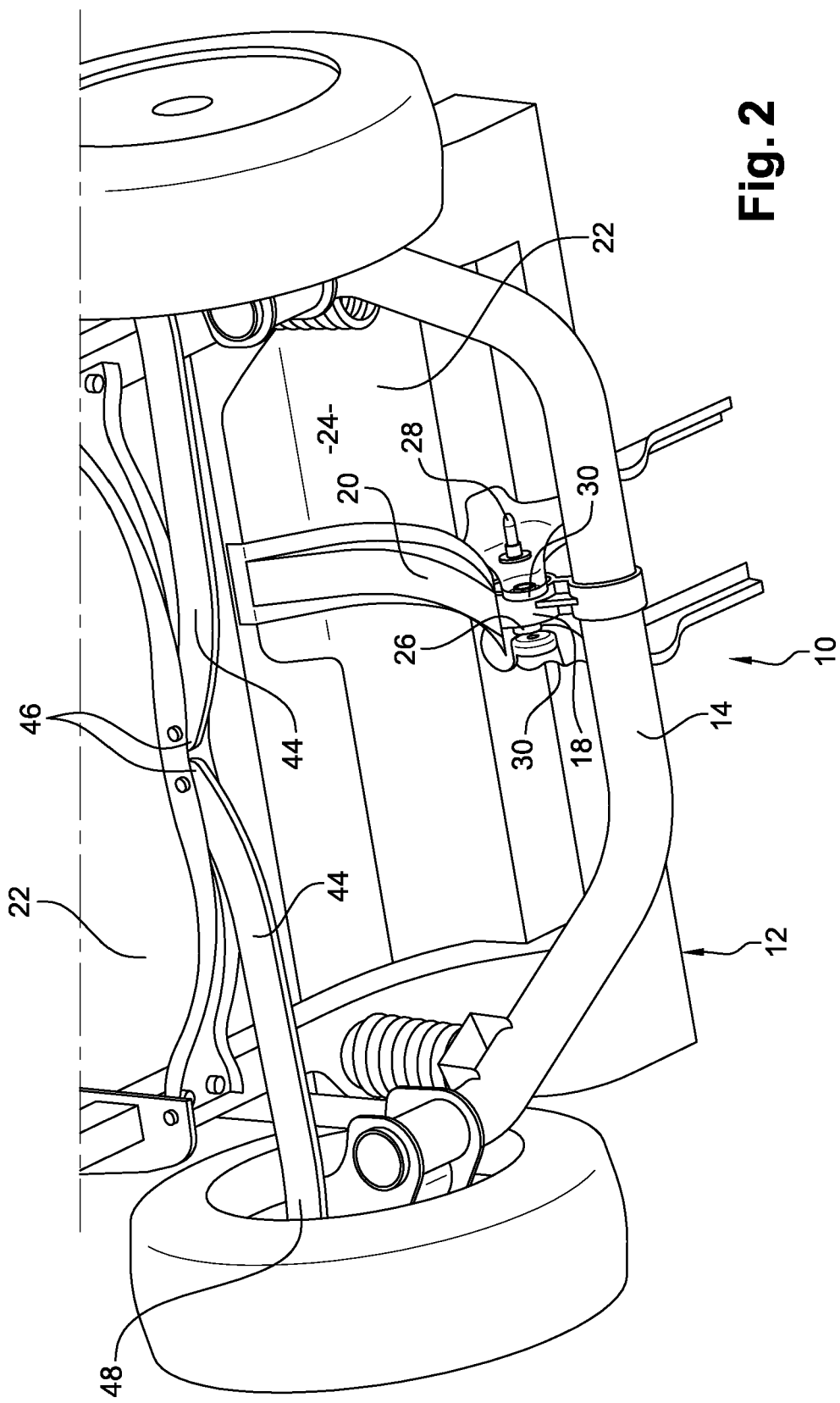
Figure 4A:
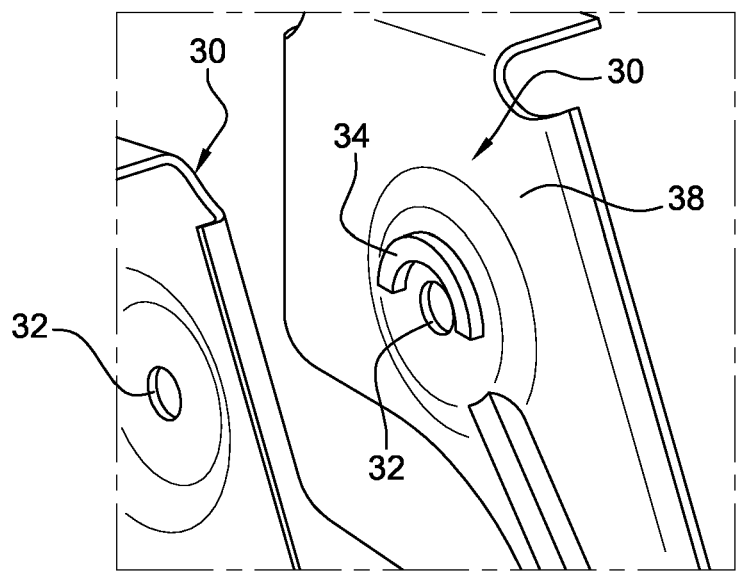
Figure 4B:
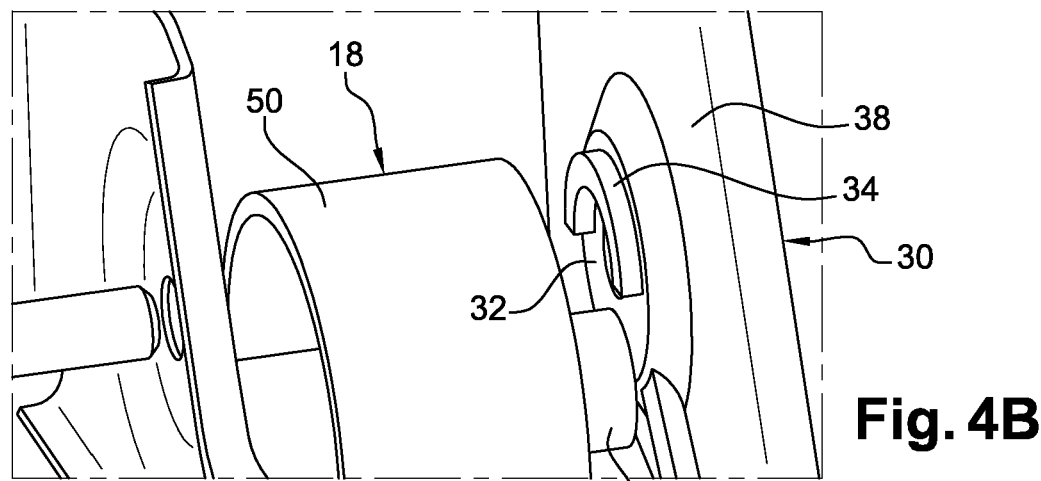
Figure 4C:
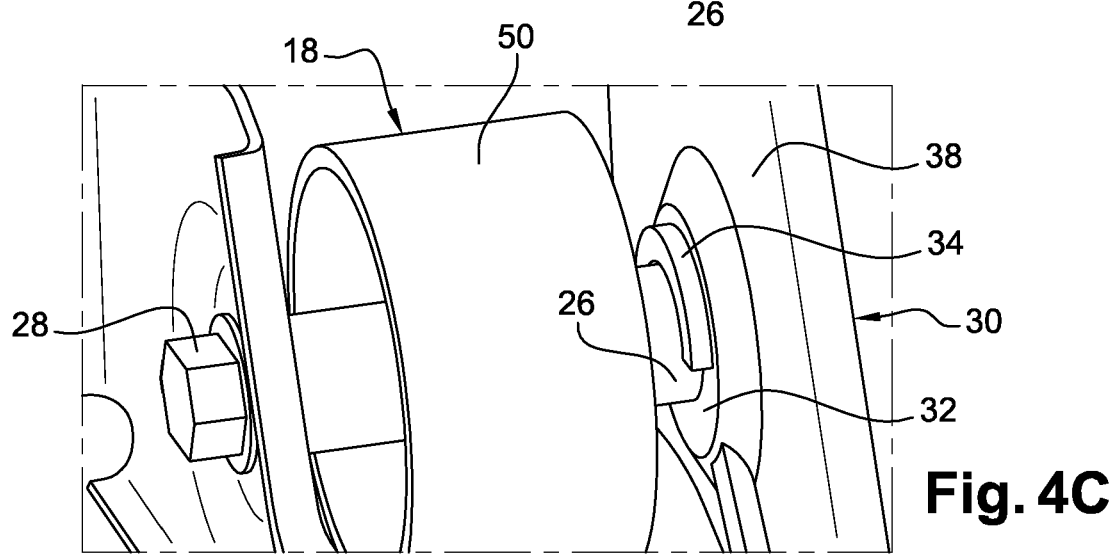
Figure 5A:
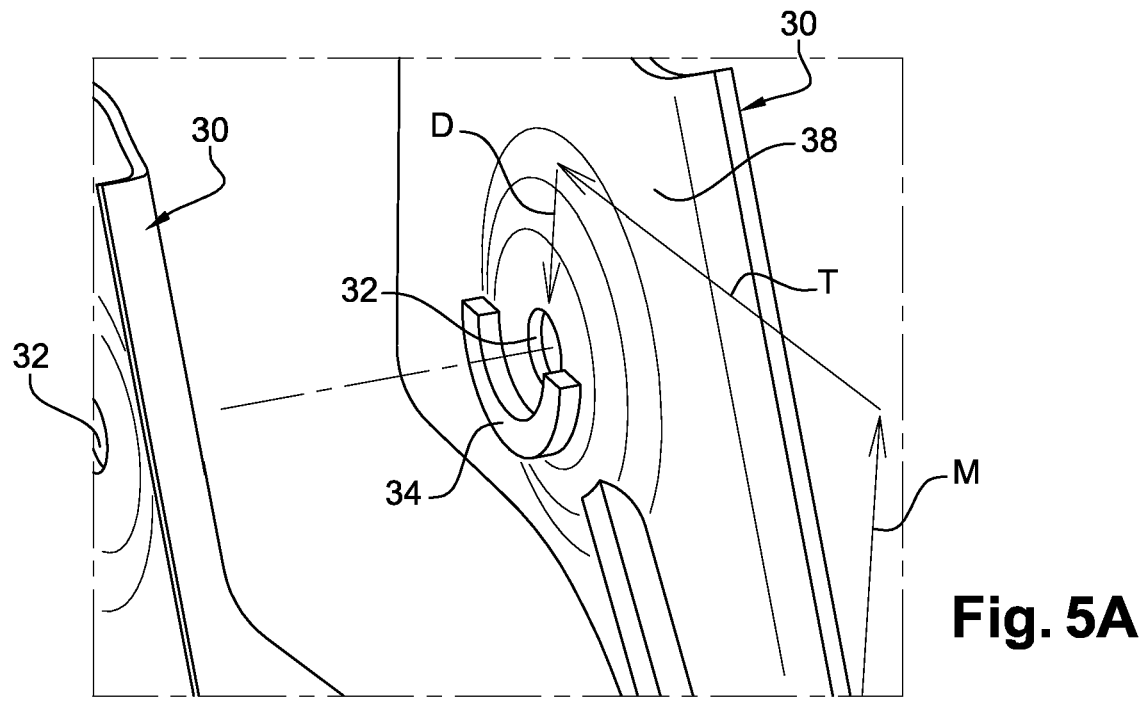
Figure 5B:
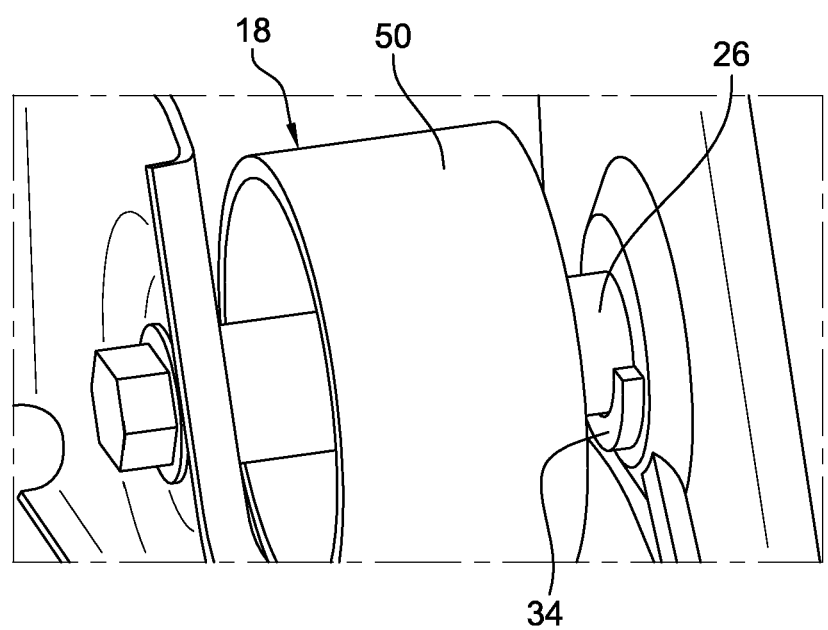

Other features and advantages of the invention are given in the detailed description below, provided with reference to the attached drawings, in which:

FIG. 1 is an exploded perspective view of a portion of a structural bodywork element and a rear axle of a vehicle according to the prior art, FIG. 2 is an assembled perspective view of a portion of a structural bodywork element and the rear axle of a vehicle in FIG. 1, FIG. 3 is a detailed perspective view of the attachment of an upper attachment extremity of the rear axle according to a first embodiment of the invention, FIGS. 4A to 4C are perspective views showing the steps for attaching an upper attachment extremity of the rear axle according to a second embodiment of the invention, FIGS. 5A and 5B are perspective views showing the steps for attaching an upper attachment extremity of the rear axle according to a third embodiment of the invention.

In the description below, identical reference signs refer to identical parts or parts having similar functions.

FIG. 1 shows a rear portion 10 of a motor vehicle made according to the prior art.

In a known manner, the vehicle comprises a structural bodywork element 12 and a running gear 14, particularly a rear axle, that comprises at least one arm 16 comprising an upper attachment extremity 18 that is received in a sheet metal clevis 20 supported on a lower face 22 of a floor 24 of the structural bodywork element 12, In a known manner, the attachment extremity 18 comprises at least one transverse tubular sleeve 26 that fits with limited clearance between two parallel flanks 30 of said clevis 20. An attachment screw 28 is designed to pass through two coaxial bores 32 in both flanks 30 and said transverse tubular sleeve 26 so as to enable attachment of said attachment extremity 18 into the clevis 20.

Such a design raises numerous assembly issues, since the bores 32 in the flanks 30 and the tubular sleeve 26 need to be aligned, and the rear axle 14 and structural bodywork element 12 are voluminous, heavy elements that are difficult to move around precisely, even using a handling system.

It is therefore very difficult, within an assembly shop, to efficiently guide the rear axle 14 manually to a position in which the bores 32 in the flanks 30 are coaxial with the sleeve 26 before insertion of the attachment screw 28. Such operations commonly require several alignment attempts before the bores 32 are successfully aligned with the sleeve 26. This slows down the assembly line for such a vehicle.

The invention overcomes this drawback by proposing a motor vehicle comprising means 34 for guiding the attachment extremity 18 of the arm 16 of the rear axle 14 designed to enable the sleeve 26 to be positioned coaxially with the bores 32 in the flanks 30.

For this purpose, the invention proposes a motor vehicle of the type described above, characterized in that the clevis 20 has means 34 for guiding the attachment extremity 18 towards a position in which the bores 32 in the flanks 30 and in the sleeve 26 are aligned.

Any of the guide means known in the prior art could be used to correctly implement the invention. In particular, any means for guiding the upper attachment extremity 18, the form of which is described in greater detail in the description below, intended to bring said upper attachment extremity 18 of the arm 16 to a specific position in which the bores 32 in the flanks 30 and the sleeve 26 are aligned coaxially, could be used to correctly implement the invention.

However, in the preferred embodiment of the invention, to optimize the accuracy of the guidance function, each flank 32 has means 34 for guiding a corresponding axial end of the tubular sleeve 26 towards the position in which the bores 32 in the flanks 30 and in the sleeve 26 are aligned.

Indeed, the closer the guide means 34 are to the sleeve 26, the better said guide means are able to guide the sleeve 26 into alignment with the bores 32 in the flanks 30 with limited coaxial tolerance.

As shown in FIGS. 3 to 5B, each guide means 34 projects perpendicular from a face 38 of the flank 30 that is oriented towards the sleeve 26. Each guide means 34 extends in a transverse plane parallel to the face 38 and has an arch shape in which the concavity is designed to determine an immobilized position for the end of the tubular sleeve 26 butting against the guide means 34, the tubular sleeve 26 being coaxial to the bore 32 in the flank 30.

Indeed, since the guide means 34 are arranged around a concave arch shape, said means are able to immobilize the tubular sleeve 26, once same has entered the concavity of said guide means 34, in one vertical direction and both horizontal directions.

The guide means may take numerous different forms.

According to first, second and third embodiments shown in FIGS. 3 to 5B, each guide means 34 comprises a rib 34 arranged around an arch shape.

According to a first embodiment shown in FIG. 3, the arch shape of the rib 34 is trapezoidal and matches the external diameter of the sleeve 26. When the rear axle 14 is raised towards the structural bodywork element 12, as shown by the arrow in FIG. 3, the opposing axial ends of the sleeve 26 enter the trapezoidal rib 34. The sleeve 26 is then blocked against the small base of the trapezoidal rib and against both non-parallel sides of the trapezoidal rib 34.

According to the second and third embodiments shown in FIGS. 4A to 5B, the arch shape of the rib 34 is semi-circular and has an internal diameter that matches the external diameter of the sleeve 26.

In the second embodiment shown in FIGS. 4A and 4B, the concavity of the rib 34 is oriented away from the floor 22 to enable the end of the tubular sleeve 26 to be moved to the immobilized position by raising said sleeve 26.

In this layout, the tubular sleeve 26, when raised, fits into the rib 34 and is then surrounded by said trapezoidal rib 34, which immobilizes same in the vertical direction and in both transverse directions, by means of the flanks 38, as shown in FIG. 4C.

In the third embodiment shown in FIGS. 5A and 5B, the concavity of the rib 34 is oriented towards the floor to enable the end of the tubular sleeve 26 to be moved to the immobilized position by lowering said sleeve 26 and to subsequently stop the sleeve 36 from descending, which enables same to be held in said immobilized position by gravity.

With this layout, since the flanks 30 are positioned beneath the floor 22 of the vehicle, the attachment extremity 18 of the axle must first be raised vertically along a path M in front of the flanks 30 to above the rib 34, then moved transversally to a point level with the rib 34 along a path T, before being dropped vertically along a path D to cause the end of the tubular sleeve 26 to rest in and be engaged in the rib 34. This movement is shown in detail using the arrows M, T and D in FIG. 5A.

In a fourth embodiment of the invention (not shown), each guide means has a series of lugs arranged around the arch shape.

The lugs can be arranged regularly and are preferably separated from one another by a distance less than the diameter of the sleeve 26, to prevent the sleeve from coming out between two lugs.

The invention is particularly suited to use in a semi-rigid rear axle 14 of the type shown in FIGS. 1 and 2. The running gear 14 includes a central tubular arm 16 comprising a transverse section 40, a central portion of which has the attachment extremity 18, and two trailing arms 42 extending on either side of the transverse section 40.

The running gear 14 also advantageously has two cross arms 44, which have first ends 46 articulated with a cradle 50 attached beneath the lower face of the floor 22 of the structural bodywork element 12, and second ends 48 articulated with the ends of the trailing arms 48.

With this layout, as shown in FIG. 1, the attachment element 18 includes an upper ring 50 that includes a bore 52 designed to receive a cylindrical elastomer element 54 holding the tubular sleeve 26 captive, and a lower ring 56 that holds the central arm and that includes a foot 58 and a semi-cylindrical cover 60 that are attached to one another non-permanently to enable said ring 56 to be attached to the central arm 16.

The invention therefore facilitates the simple and efficient attachment of a running gear 16.

The invention claimed is:

1. A motor vehicle comprising:
a structural bodywork element; and
a running gear that comprises at least one arm comprising an upper attachment extremity that is received in a sheet metal clevis supported on a lower face of a floor of the structural bodywork element,
wherein said attachment extremity comprises at least one transverse tubular sleeve that fits with limited clearance between two parallel flanks of said clevis,
wherein said sleeve is mounted on the arm in fixed position with respect to the arm,
wherein an attachment screw is configured to pass through two coaxial bores in both flanks and said transverse tubular sleeve so as to enable attachment of said attachment extremity into the clevis, and
wherein:
the clevis comprises means for guiding the attachment extremity into a position in which the bores in the flanks and in the sleeve are aligned, and
the means for guiding has an arch shape with an open portion downwardly facing in a direction perpendicular to the floor.

2. The motor vehicle as claimed in claim 1, wherein each flank has means for guiding a corresponding axial end of the tubular sleeve towards the position in which the bores in the flanks and in the sleeve are aligned.

3. The motor vehicle as claimed in claim 2, wherein each guide means extends perpendicular from one face of said flank oriented towards the sleeve, and each guide means is arranged in a transverse plane, has an arch shape and is configured to determine an immobilized position for the end of the tubular sleeve butting against the guide means, the tubular sleeve being coaxial to the bore in the flank, and includes a rib arranged around the arch shape.

4. The motor vehicle as claimed in claim 3, wherein each guide means includes a series of lugs arranged around the arch shape.

5. The motor vehicle as claimed in claim 1, wherein each guide means includes a rib arranged around the arch shape.

6. The motor vehicle as claimed in claim 5, wherein the arch shape of the rib is semi-circular and an internal diameter of the rib corresponds to an external diameter of the sleeve.

7. The motor vehicle as claimed in claim 5, wherein the arch shape of the rib is trapezoidal and matches an external diameter of the sleeve.

8. The motor vehicle as claimed in claim 5, wherein the concavity of the rib is oriented to enable the end of the tubular sleeve to be moved to the immobilized position by raising said sleeve into the rib.

9. The motor vehicle as claimed in claim 1, wherein the running gear includes a rear axle that is semi-rigid and comprises:

a central tubular arm comprising a transverse section, a central portion of which has the attachment extremity, and two trailing arms extending on either side of the transverse section, two cross arms, which have first ends articulated with a cradle attached beneath the lower face of the floor of the structural bodywork element, and second ends articulated with the ends of the trailing arms, wherein the rear axle includes an attachment element that includes an upper ring that includes a bore to receive a cylindrical elastomer element in turn to coaxially receive the tubular sleeve, and a lower ring that holds the central arm and that includes a foot and a semi-cylindrical cover that are attached to one another.

10. The motor vehicle as claimed in claim 1, wherein a first member comprises the structural bodywork element and the clevis joined to a lower face of a floor of the structural bodywork element, a second member comprises the running gear, and the second member is joined to first member using the clevis and the attachment screw.

11. The motor vehicle as claimed in claim 1, wherein the clevis extends below the lower face of the floor of the structural bodywork element.

* * * * *